(12) United States Patent
Yoda et al.

(10) Patent No.: US 6,322,343 B1
(45) Date of Patent: Nov. 27, 2001

(54) COMPACT INJECTION MOLDING MACHINE WITH CASTERS

(75) Inventors: Tsukasa Yoda; Kenji Fujiki, both of Sakaki-machi (JP)

(73) Assignee: Nissei Plastics Industrial Co., Ltd. (JP)

( * ) Notice: Subject to any disclaimer, the term of this patent is extended or adjusted under 35 U.S.C. 154(b) by 0 days.

(21) Appl. No.: 09/415,782

(22) Filed: Oct. 8, 1999

(30) Foreign Application Priority Data

Oct. 13, 1998 (JP) .................................................. 10-290379
Oct. 13, 1998 (JP) .................................................. 10-290381

(51) Int. Cl.$^7$ .................................................. B29C 45/17
(52) U.S. Cl. ........................... 425/62; 425/144; 425/150; 425/556; 425/589
(58) Field of Search ............................. 425/62, 143, 144, 425/150, 556, 589, 450.1

(56) References Cited

U.S. PATENT DOCUMENTS

| | | | |
|---|---|---|---|
| 2,107,190 | * | 2/1938 | Shaw .................................... 425/143 |
| 2,718,662 | * | 9/1955 | Bohannon et al. .................. 425/146 |
| 4,009,983 | * | 3/1977 | Jacobs .............................. 425/451.1 |
| 4,257,755 | * | 3/1981 | Lemelson ............................ 425/168 |
| 5,536,159 | * | 7/1996 | Yamamura et al. ................. 425/149 |
| 5,620,646 | * | 4/1997 | Sparer et al. .................... 264/328.14 |

FOREIGN PATENT DOCUMENTS 05237865    9/1993  (JP) .
08164536    6/1996  (JP) .

* cited by examiner

Primary Examiner—Nam Nguyen
Assistant Examiner—Donald Heckenberg
(74) Attorney, Agent, or Firm—Ostrolenk, Faber, Gerb & Soffen, LLP (57) ABSTRACT

There is provided a compact injection molding machine with casters. An injection unit and a mold clamping unit in the compact injection molding machine are disposed longitudinally on a base cabinet which is formed of a tall cabinet with a rectangular top surface. The molding machine can be manually moved and installed by mounting the casters on the bottom of the base cabinet. The inside of the base cabinet is partitioned with partition plates and receives units and devices required for the injection molding of resin. The injection unit and mold clamping unit may use any of oil pressure and electric power as their driving source. In the case of oil pressure, a hydraulic driving circuit and the like are received in the base cabinet, and in the case of electric power, electric servomotors and the like are received in the base cabinet. Further, the operation side of the top surface of base cabinet can be formed into a work table, by disposing the injection unit and mold clamping unit longitudinally offset toward the counter-operation side on the top surface of base cabinet.

6 Claims, 7 Drawing Sheets

COMPACT INJECTION MOLDING MACHINE WITH CASTERS

BACKGROUND OF THE INVENTION

1. Field of the Invention

This invention relates to a wagon type compact injection molding machine with casters in which inside and outside a base cabinet of the machine, all units and devices required for injection molding are assembled, and which can be manually moved and installed on an arbitrary place.

2. Background Art

The conventional type of compact injection molding machine has a base cabinet formed in larger size than an injection unit and a mold clamping unit in order to ensure footprints for a hydraulic pump and the like, even though the injection unit and mold clamping unit are reduced in size. Such a base cabinet is, however, merely a downsized one of usual structure, and consequently the whole machine including molds is adapted to be moved and installed by hoisting it with a crane in the same way as before, even if it has achieved weight reduction by downsizing.

In a specification of Japanese Utility Model Laid-Open Publication No. Hei 6-20027, an electric type injection molding machine is described which is intended to make it compact in size by making use of the inside of its base cabinet to receive a control unit, a mold temperature regulator and the like, and which is adapted to be movable by using load wheels mounted on the base cabinet. Movement of the molding machine in accordance with this prior art, however, essentially necessitates a guide rail laid down on a floor plate, and hence the movement of machine is exclusively limited to the direction of the rail once the machine has been installed. It is not possible, therefore, to move the machine into any other direction to reinstall it.

In addition, in this prior art molding machine, a plurality of electric servomotors, which drive an injection unit and a mold clamping unit, are all mounted vertically on the upper part of the respective units of the molding machine; this makes the molding machine taller, and higher in the barycenter more than necessary. Further, this prior art molding machine has not yet achieved the size reduction so as to allow easy movement, though it was intended to provide a compact injection molding machine by making use of the inside of base cabinet.

In recent years, molds have also become lightweight so as to be held by hand due to the weight reduction by downsizing, allowing the mold exchange to be performed by manual work. However, since the base cabinet has no footprint for molds thereon, the treatment for mold exchange is more troublesome than that with the aid of an exchange device as before; this creates a problem that mold exchanges at frequent intervals impose burdensome work particularly on female workers.

SUMMARY OF THE INVENTION

The present invention was devised to resolve the above-mentioned problems associated with an injection molding machine. Accordingly, it is an object of the present invention to provide a novel compact injection molding machine in which a base cabinet is formed of a tall cabinet with a rectangular top surface and which is put together more compact than prior art molding machines by utilizing the inside and top surface of its base cabinet, and which is constructed so as to be manually moved with ease like a wagon by adopting casters.

Another object of the present invention is to provide a new compact injection molding machine which may use any of oil pressure and electric power as their driving source and which can be constructed without the need for changing the size of base cabinet even though the base cabinet has incorporated the driving source and mold temperature regulator together into it, and which permits the top surface of base cabinet to be utilized as a work table.

The present invention provides a compact injection molding machine with casters which comprises an injection unit and a mold clamping unit which use oil pressure as their driving source; mold cooling means composed of a chiller unit cooler, a water tank and a cooling water pressure pump; a mold temperature regulator for regulating mold temperature; hydraulic drive means such as a hydraulic pump, an oil tank and valve units in a hydraulic circuit; a control unit which controls each of these units; and a base cabinet formed of a tall cabinet with a rectangular top surface; wherein the base cabinet allows the molding machine to be manually moved and installed by mounting casters on the bottom of the cabinet; the injection unit and the mold clamping unit are disposed longitudinally on the top surface of the base cabinet; the inside of the base cabinet is partitioned into upper and lower parts by at least one partition plate; within the base cabinet, the mold cooling means and the mold temperature regulator are received on a floor plate below the partition plate, the hydraulic drive means and the control unit are received on the partition plate, and the hydraulic drive means is connected to the injection unit and mold clamping unit via the hydraulic circuit.

Furthermore, the present invention provides a compact injection molding machine with casters which comprises an injection unit and a mold clamping unit which use electric power as their driving source; a servomotor for injection which moves together with the injection unit, a servomotor for metering and a servomotor for nozzle touch; a servomotor for mold clamping and a servomotor for an ejector; and a base cabinet formed of a tall cabinet with a rectangular top surface; wherein the base cabinet allows the molding machine to be manually moved and installed by mounting casters on the bottom of the cabinet; the injection unit and mold clamping unit are disposed longitudinally on the top surface of the base cabinet at right side and left side in order respectively; the inside of the base cabinet is partitioned into upper, lower, right and left reception chambers by at least two partition plates; and within the base cabinet, the servomotor for injection, the servomotor for metering and the servomotor for nozzle touch are received in the reception chamber of upper right half, while the servomotor for mold clamping, the servomotor for ejector and a water tank are received in the reception chamber of upper left half, and other units and devices required for the injection molding of resin are received on the floor of the lower reception chambers.

It is preferable that the injection unit and mold clamping unit are disposed longitudinally offset toward the counter-operation side on the top surface of base cabinet so that the operation side of the top surface of base cabinet is formed as a work table.

It is also preferable that at the nearly central part of a front plate of said base cabinet, a molding product chute of a chuter is provided, said chuter being disposed in said base cabinet at a position below an open space of the mold clamping unit opened.

In the above-mentioned configuration in accordance with the present invention, since all units and devices composing an injection molding machine are integrated into a base cabinet which can be moved by the castors mounted thereon, we have only to secure an installation space for base cabinet in order to prepare the footprint for a molding machine. Further, the compact injection molding machine in accordance with the present invention has an ease of treating which permits the molding machine to be moved easily without being subjected to any constraint of directionality in moving as encountered in conventional compact injection molding machines.

Also, the space secured on the operation side of the top surface of base cabinet can be used as a table for various work in injection molding of resin, to ensure the safety at mold exchange or maintenance.

BRIEF DESCRIPTION OF THE DRAWINGS

These and other objects and advantages of the present invention will become clear from the following description with reference to the accompanying drawings The drawings show embodiments of the compact injection molding machine with castors in accordance with the present invention.

DETAILED DESCRIPTION OF THE PREFERRED EMBODIMENTS

Throughout all drawings, the base cabinet is denoted by the reference numeral 1, and the injection unit and mold clamping unit disposed on the base cabinet are denotes by 2 and 3, respectively. The injection unit 2 and mold clamping 3 are both covered with a cover 4.

The injection unit 2 has dimensions such as, for example, 14 mm in the diameter of a screw in a heating cylinder, and 6.2 cm$^3$ in the injection capacity per shot. The mold clamping unit 3 is a compact one which is, for example, 110 mm in both of the mold clamping stroke and the minimum usable mold thickness, and 102 mm in the tie bar interval.

The base cabinet 1 consists of a tall cabinet with a rectangular top surface, said cabinet being, for example, 1425 mm in the length, 1100 mm in the height and 490 mm in the width. Castors 5 are mounted at the four corners on the bottom of the tall cabinet together with stand members 6 so that the base cabinet 1 itself may also serve as a transport member.

Figure 1:
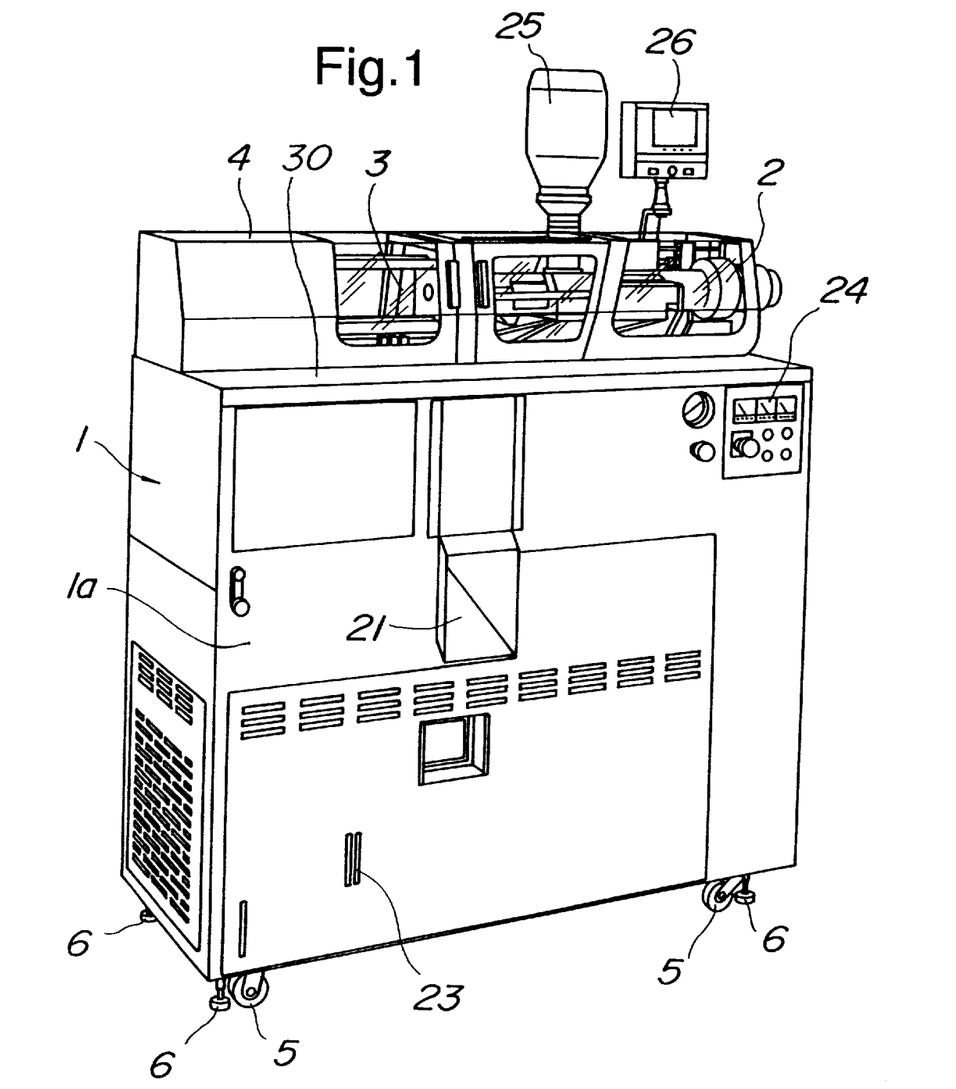
FIG. 1 is a perspective view of a compact injection molding machine in accordance with the present invention which uses oil pressure as a driving source for an injection unit and a mold clamping unit.
Figure 5:
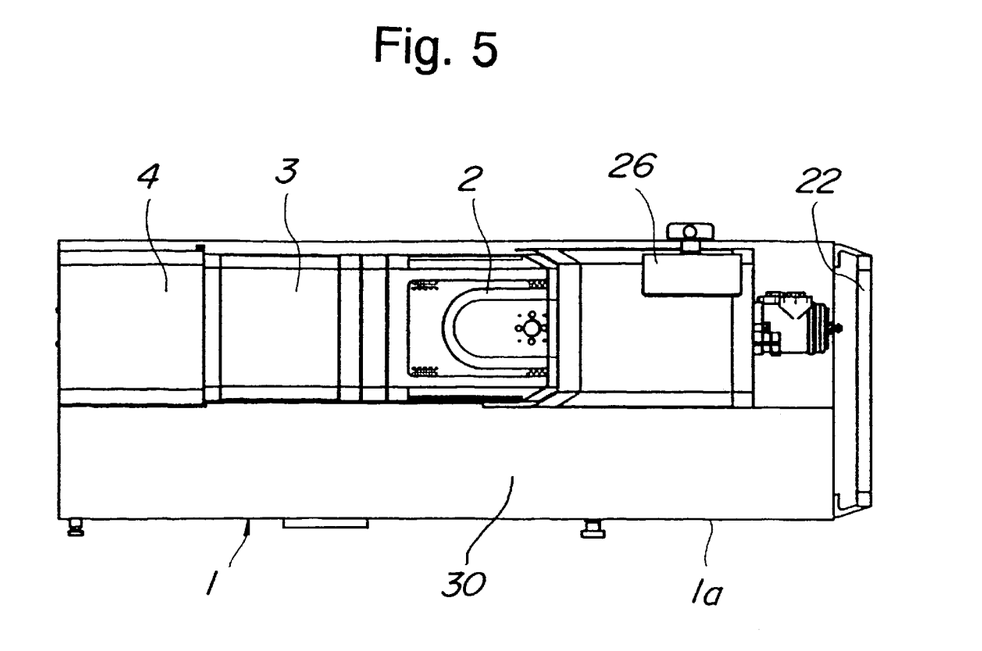
FIG. 5 is a top view of FIG. 1.

The injection unit 2 and mold clamping unit 3 are, as shown in FIGS. 1 and 5, disposed longitudinally offset toward the counter-operation side on the top surface of the base cabinet. Thus, the operation side of the top surface of base cabinet provides a work space 30. Also, at the nearly central part of the front plate 1a of base cabinet 1, there is provided a molding product chute of a chuter 21 which is disposed in the base cabinet at a position below an open space of the mold clamping unit opened. A pusher 22 is mounted on the upper part of the side face on the injection unit side of base cabinet 1 (see FIG. 2).

Figure 2:
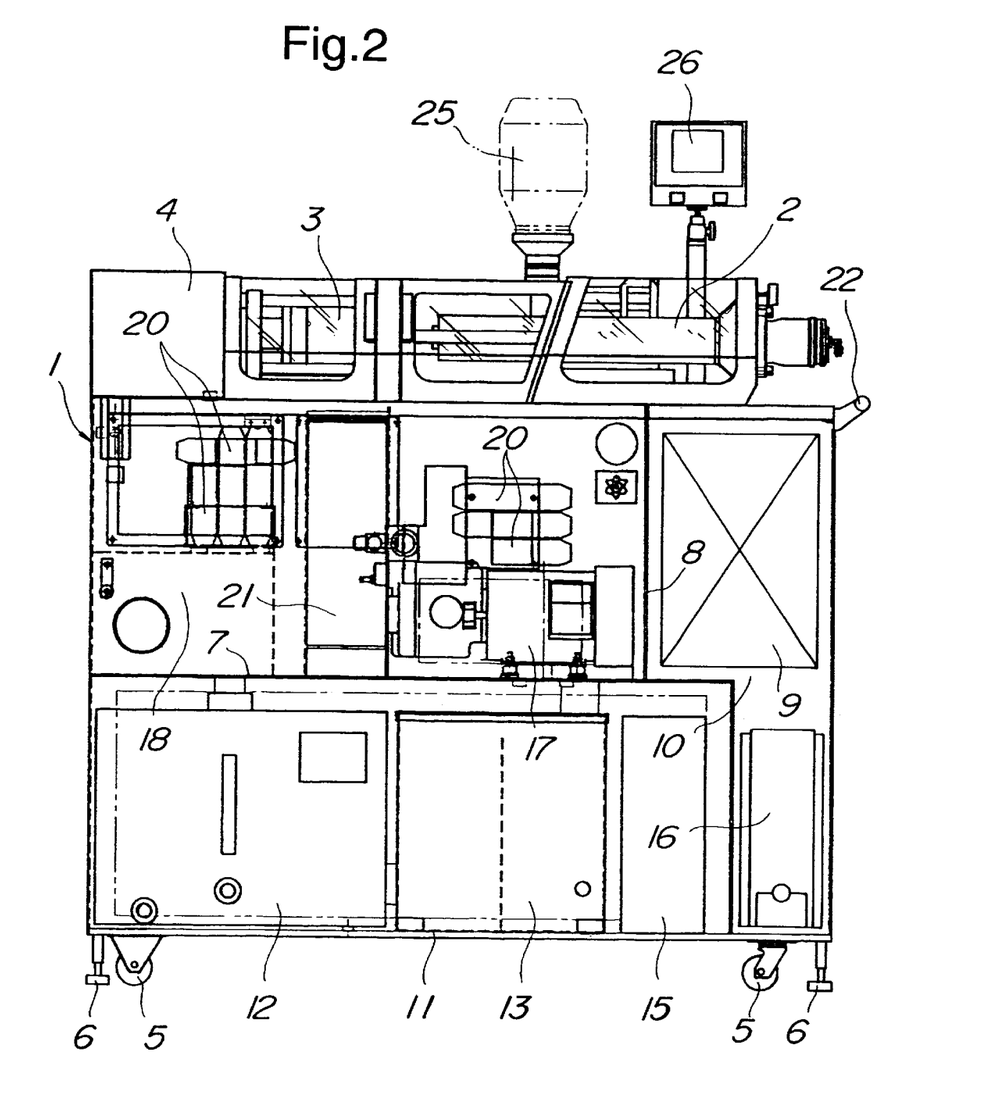
FIG. 2 is a front view of the compact injection molding machine shown in FIG. 1, with the vertical cross section of a base cabinet.
Figure 3:
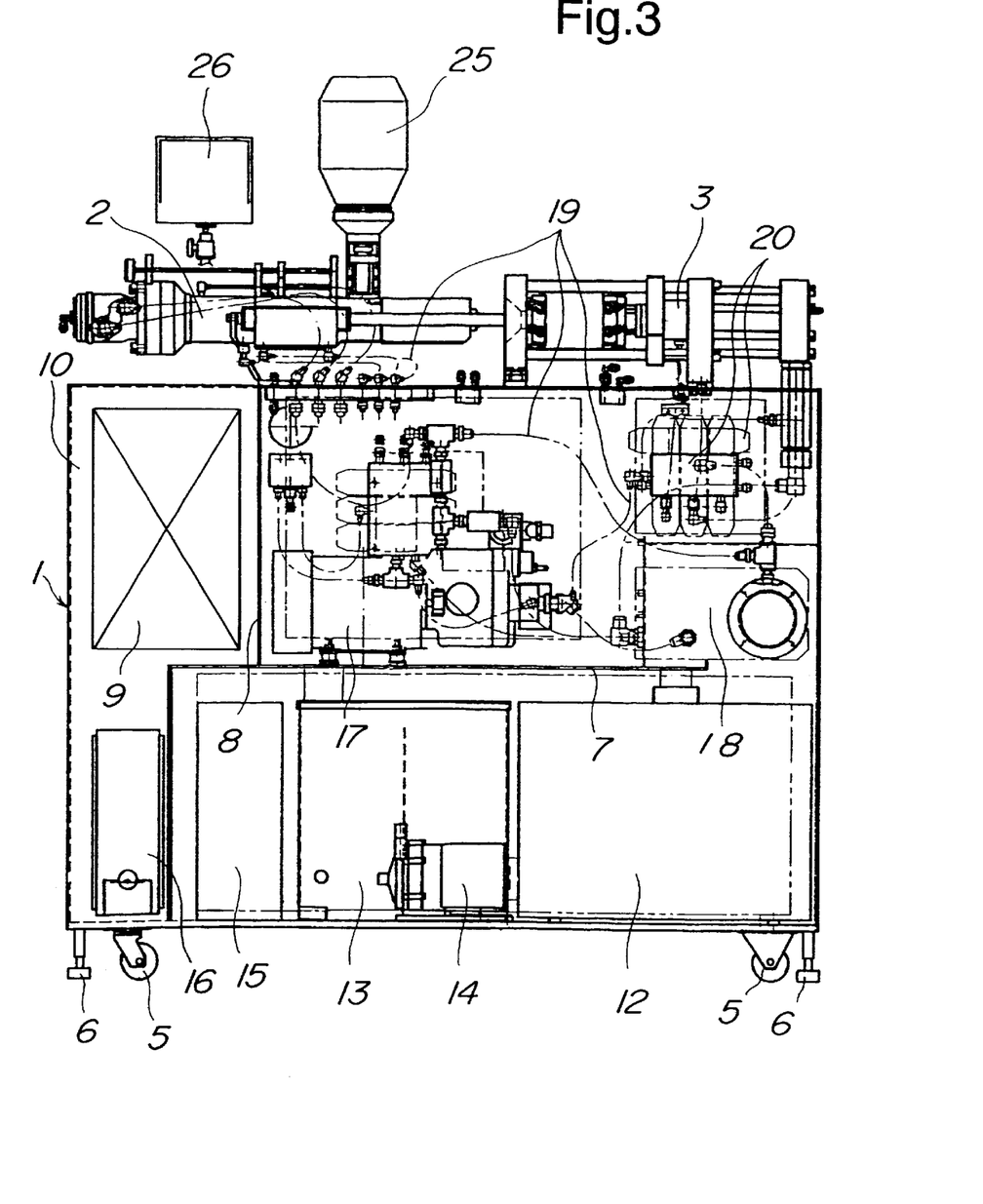
FIG. 3 is a rear view of the uncovered injection unit and mold clamping unit of the compact injection molding machine shown in FIG. 1, with the vertical cross section of the base cabinet.
Figure 4:
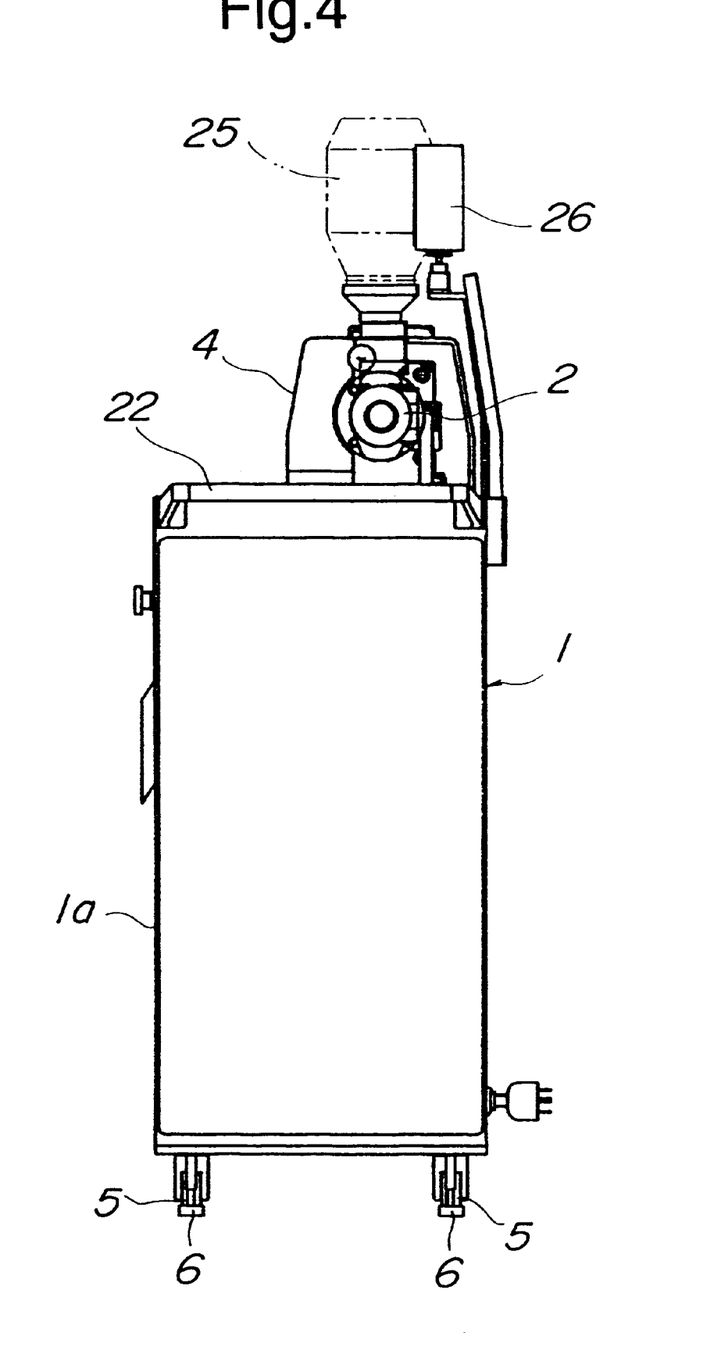
FIG. 4 is a right side view of FIG. 1.

The inside of base cabinet somewhat differs between the injection molding machine which uses oil pressure as its driving source (hydraulic type) and that which uses electric power as its driving source (electric type). In the case of a hydraulic type molding machine, as shown in FIG. 2 and 3, the inside of base cabinet 1 is partitioned into upper and lower parts by a partition plate 7, and further the inside of base cabinet below the injection unit is partitioned by a partition plate 8 to provide a reception chamber 10 for a control unit 9.

Within the base cabinet 1, on a bottom plate 11 below the partition plate 7, received are mold cooling means composed of a chiller unit cooler 12, a water tank 13 and a cooling water pressure pump 14, and a mold temperature regulator 15 and a cord reel 16 for power supply. Also, on the partition plate 7, received are hydraulic drive means composed of such as a hydraulic pump 17, an oil tank 18 and valve units 20 in a hydraulic circuit 19 which connect the hydraulic pump 17 and the oil tank 18. The hydraulic drive means is connected to the injection unit 2 and mold clamping unit 3 via the hydraulic circuit 19.

Here, the reference numeral 23 denotes an observation port of a water meter of the chiller unit cooler 12, and 24 denotes a switch arranging portion, which is disposed at an area of the reception chamber 10 behind the front plate 1a. The reference numeral 25 denotes a hopper, and 26 a monitor device for controllers.

Figure 6:
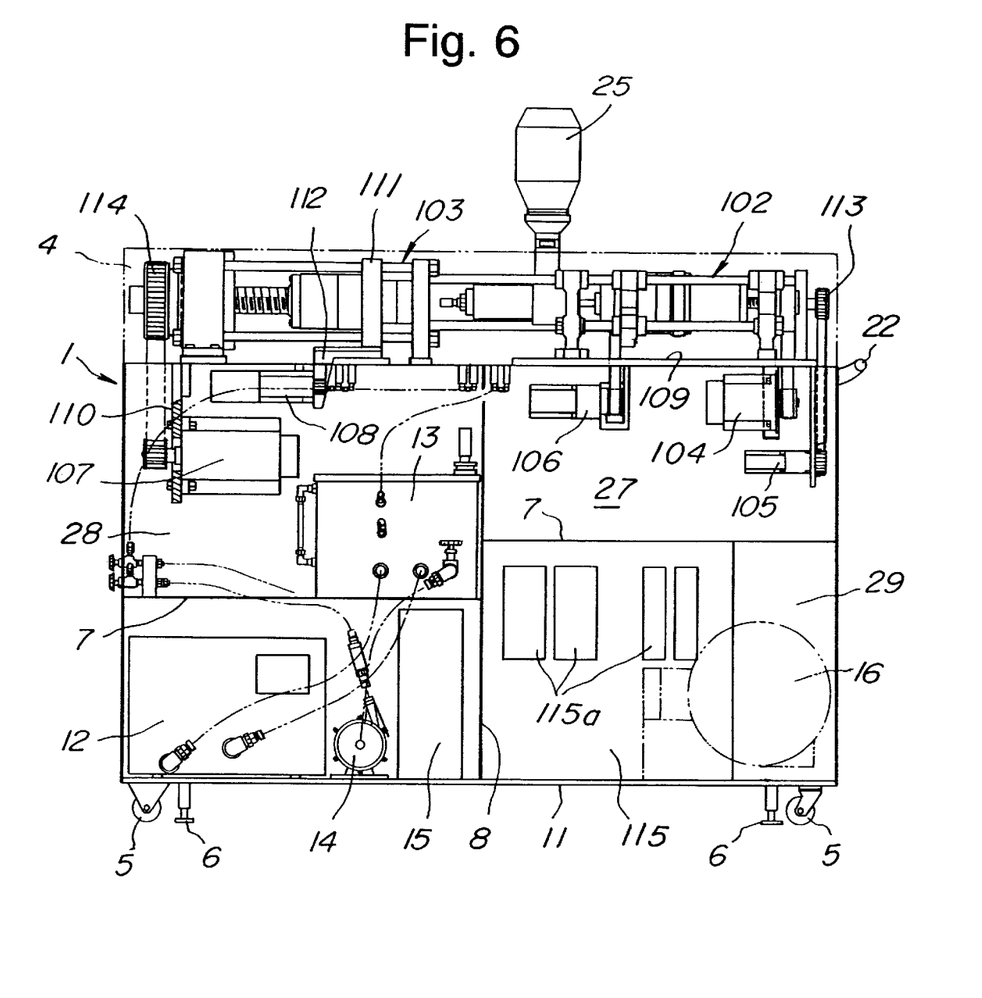
FIG. 6 is a front view of the uncovered compact injection molding machine in accordance with the present invention which uses electric power as a driving source for the injection unit and mold clamping unit, with the vertical cross section of base cabinet.
Figure 7:
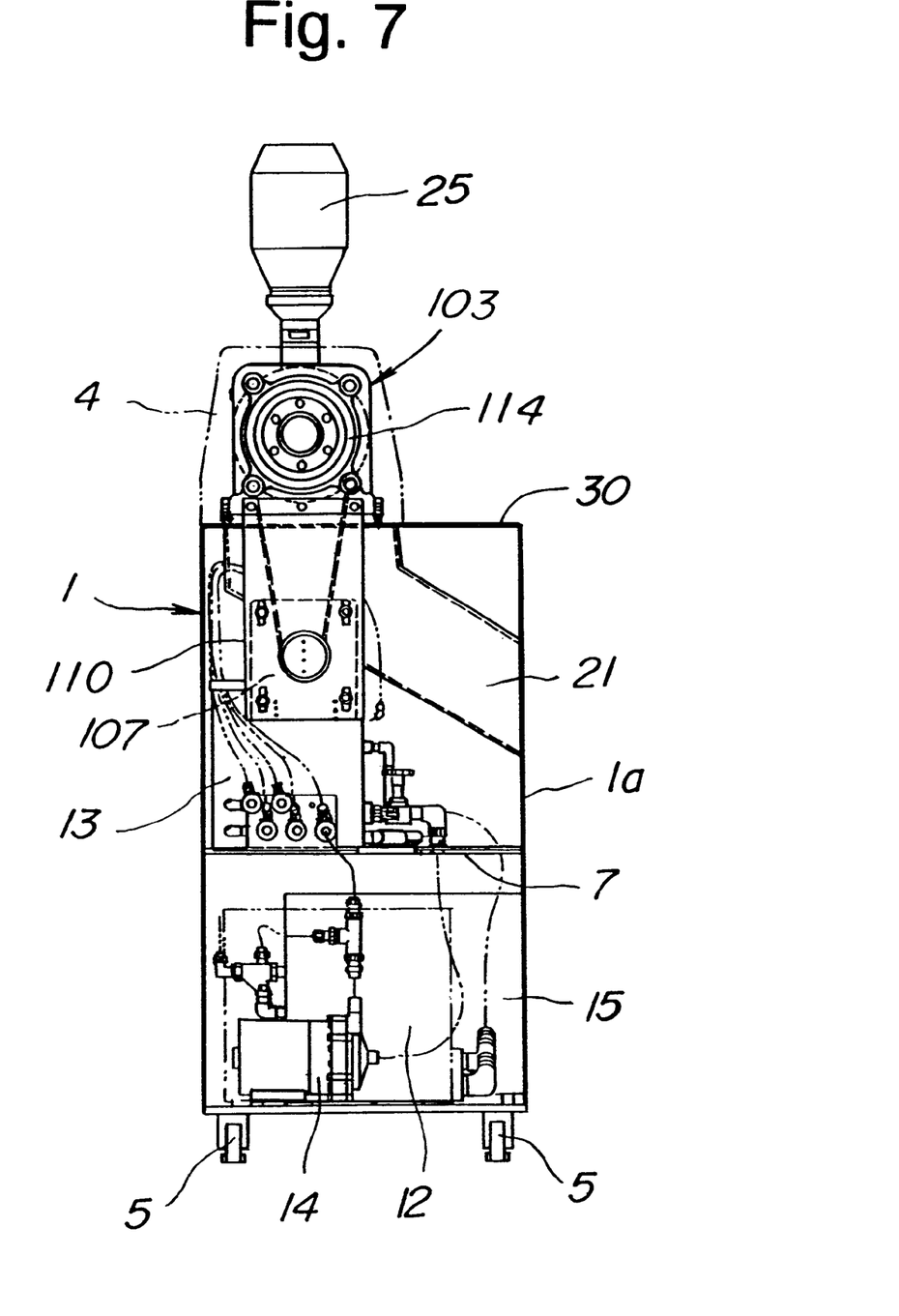
FIG. 7 is a left side view of the compact injection molding machine in FIG. 6, with the vertical cross section of the base cabinet.

FIGS. 6 and 7 show the case of electric type molding machine. An injection unit 102 and mold clamping unit 103 on the base cabinet 1 are provided with a DC or AC type electric servomotor as their driving source. They are an injection unit and a mold clamping unit of ordinary structures which perform the injection and metering of resin, the opening and closing of mold, and the mold clamping, by transforming a rotary motion by the servomotor into a linear motion by ball screws and nut members of ordinary structures.

The inside of base cabinet 1 of this electric type molding machine is also partitioned into upper and lower parts, and right and left parts by a transverse partition plate 7 and a vertical partition wall 8, in the same way as a hydraulic type molding machine shown in FIGS. 2 and 3. In the case of an electric type molding machine, however, since an oil tank and hydraulic valve devices are unnecessary, inside the upper part, where the oil tank and valve devices would be received if it were an oil pressure type molding machine, right half part thereof is used as a reception chamber 27 for a servomotor 104 for injection, a servomotor 105 for metering and a servomotor 106 for nozzle touch, and left half part thereof is used as a reception chamber 28 for a servomotor 107 for mold clamping and a servomotor for the ejector 108.

Of these electric servomotor, the servomotor 104 for injection, the servomotor 105 for metering and the servomotor 106 for nozzle touch are each received in the base cabinet being mounted onto a bracket connected to a base 109 which is slidable as far as the injection unit 102 itself, so as to move forward or backward together with the injection unit 102 (FIG. 6 does not show this situation in detail).

The servomotor 107 for mold clamping, which is not moved, is received in the base cabinet being mounted onto a bracket plate 110 connected to the mold clamping unit 103. On the other hand, the servomotor 108 for the ejector, which is mounted onto a bracket 112 connected to a movable plate 111, is received so as to move together with the movable plate 111 in response to the opening and closing of mold.

The torque generated by each servomotor is transmitted to an actuator on the injection unit side or mold clamping unit side via a timing belt which is looped over a pulley of each servomotor and a pulley on the injection unit side or mold clamping unit side. For example, the torque generated by the servomotor 105 for metering is transmitted to a pulley 113 at the end of the unit to provide a torque for an injection screw (not shown), and the torque by the servomotor 107 for mold clamping is transmitted to a pulley 114 at the end of the mold clamping unit 103 to provide a clamping force.

Three electric servomotors including the servomotor 104 for injection, etc. in the base cabinet moves in the reception camber 27 in response to the forward or backward movement of the injection unit 102. Thus, the reception chamber 27 of the right half part can not afford any space to receive other units. However, since a space for installation occurs on the partition plate 8 side of the reception chamber 28 of right half part, the water tank 13 can be disposed at that space to be formed as a reception chamber 29 below the reception chamber 27, and thereby a control unit 115 and the cord coil 16 for power supply can be received in the reception chamber 29. Here, 115a denotes a servo amplifier.

As described above, the compact injection molding machine in accordance with the present invention is adapted to receive, within the base cabinet 1, all units and devices required for the injection molding of resin, including the driving source of the molding machine disposed on the base cabinet, and also to be movable by providing castors 5 for the base cabinet. By pushing the pusher 22 by hand, therefore, this molding machine can be freely moved into any direction without being subjected to any constraint of directionality, differing from the type of molding machine which is moved on a rail. Even female workers, who are more powerless than male workers, can easily transport this machine. Further, it can be easily installed at a predetermined place by setting up stand members 6.

This molding machine, which has integrated all units and devices required for injection molding into the base cabinet 1, eliminates the need for any equipment for the cooling or temperature adjustment of molds, and thus brings down the running cost. Moreover, only an installation space for the base cabinet 1 is sufficient for the footprint for the molding machine. Since the driving of the molding machine is totally performed within the base cabinet, environmental pollution is negligible. Also, the temperature adjustment which can be achieved within the base cabinet facilitates the exchange with conditioned models.

In addition, since the operation side of the top surface of the base cabinet becomes a work table 30, work of maintenance or mold exchange is facilitated by being able to keep jigs and molds and the like on the work table 30.

While the presently preferred embodiments of the present invention have been shown and described, it will be understood that the present invention is not limited thereto, and that various changes and modifications may be made by those skilled in the art without departing from the scope of the invention as set forth in the appended claims.

What is claimed is:

1. A moveable compact injection molding machine with casters comprising
    a cabinet which is taller than it is wide, having an interior and an exterior, and having a bottom surface and rectangular top surface;
    a partition plate disposed in the interior of the cabinet and dividing the cabinet interior into upper and lower parts;
    a plurality of casters disposed on the exterior of the bottom surface permitting manual movement in a plurality of directions and installation of the molding machine;
    an oil pressure driven injection unit and an oil pressure driven mold clamping unit disposed longitudinally on the exterior of the top surface of the cabinet;
    said injection unit and mold clamping unit being disposed longitudinally offset toward counter-operation side on said top surface of said cabinet so that operation side of said top surface of said cabinet is formed as a work table;
    a mold cooling unit comprising a chiller, a water tank and a cooling water pressure pump;
    a mold temperature regulator;
    a hydraulic unit comprising a hydraulic pump, oil tank valves and a hydraulic circuit connected to the injection unit and mold clamping unit;
    a control connected to the injection unit, mold clamping unit mold cooling unit, hydraulic unit and mold temperature regulator;
    the mold cooling unit and the mold temperature regulator disposed on a floor plate of the cabinet in the lower part of the cabinet interior below the partition plate; and
    the hydraulic unit and control disposed on the partition plate.

2. A moveable compact injection molding machine with casters as defined in claim 1, wherein at a central part of a front plate of said cabinet, a molding product chute of a chuter is provided, said chuter being disposed in said cabinet at a position below an open space of the mold clamping unit opened.

3. A movable compact injection molding machine with casters as defined in claim 2, having four casters disposed in spaced relationship on the exterior of the bottom surface.

4. A moveable compact injection molding machine with casters comprising
    a cabinet which is taller than it is wide, having an interior and an exterior, and having a bottom surface and rectangular top surface;
    a pair of partition plates disposed in the interior of the cabinet and dividing the cabinet interior into upper right, upper left and lower reception chambers;
    a plurality of casters disposed on the exterior of the bottom surface permitting manual movement in a plurality of directions and installation of the molding machine;
    an electric power driven injection unit and an electric power driven mold clamping unit disposed longitudinally on the exterior of the top surface of the cabinet at right side and left side in order respectively;
    said injection unit and mold clamping unit being disposed longitudinally offset toward counter-operation side on said top surface of said cabinet so that operation side of said top surface of said cabinet is formed as a work table;

an injection servomotor adapted to move together with the injection unit received in the upper right reception chamber of the cabinet interior;

a metering servomotor received in the upper right reception chamber of the cabinet interior;

a nozzle touch servomotor received in the upper right reception chamber of the cabinet interior;

a mold clamping servomotor received in the upper left reception chamber of the cabinet interior;

an ejector servomotor received in the upper left reception chamber of the cabinet interior;

a water tank received in the upper left reception chamber of the cabinet interior; and wherein the floor of the lower reception chamber is adapted to receive any other unit required for the injection molding of a resin.

5. A moveable compact injection molding machine with casters as defined in claim 4, wherein at a central part of a front plate of said cabinet, a molding product chute of a chuter is provided, said chuter being disposed in said cabinet at a position below an open space of the mold clamping unit opened.

6. A movable compact injection molding machine with casters as defined in claim 5, having four casters disposed in spaced relationship on the exterior of the bottom surface.

\* \* \* \* \*